United States Patent [19]
Bryant

[11] 3,803,849
[45] Apr. 16, 1974

[54] METHOD AND APPARATUS FOR DAMPING WAVE ACTION

[75] Inventor: Frank Allan Bryant, Houston, Tex.

[73] Assignee: The Offshore Company, Houston, Tex.

[22] Filed: July 27, 1972

[21] Appl. No.: 275,723

[52] U.S. Cl. .................................... 61/1 R, 61/6
[51] Int. Cl. ............................................ E02b 3/04
[58] Field of Search .................. 61/1, 6; 285/137 R

[56] References Cited
UNITED STATES PATENTS

| | | | |
|---|---|---|---|
| 1,391,992 | 9/1921 | Brasmer | 61/6 |
| 1,716,616 | 6/1929 | Brasmer | 61/6 |
| 1,974,402 | 9/1934 | Tempelton | 285/137 R |
| 2,325,937 | 8/1943 | Brasmer | 61/1 R |
| 2,382,393 | 8/1945 | Bille | 61/1 R |
| 3,148,509 | 9/1964 | Laurie | 61/1 R |
| 3,151,463 | 10/1964 | Talbot | 61/1 R |
| 3,461,675 | 8/1969 | Izatt | 61/11 |

FOREIGN PATENTS OR APPLICATIONS 3,178   4/1900   Great Britain ................ 285/137 R

*Primary Examiner*—Mervin Stein
*Assistant Examiner*—Alexander Grosz

[57] ABSTRACT

A method of and apparatus for damping wave action on a section of water including injecting sufficient amount of air in discrete, minute bubbles under the water to dissipate a major portion of the wave energy by irreversible thermodynamic compression and expansion of such bubbles. The apparatus includes a supply of air, bubble generating means positioned in the water and having bubble generating elements to generate a multitude of minute, discrete bubbles which are sufficiently small to damp the wave action. This abstract is neither intended to define the invention of the application which, of course, is measured by the claims, nor is it intended to be limiting as to the scope of the invention in any way.

1 Claim, 4 Drawing Figures

PATENTED APR 16 1974 3,803,849
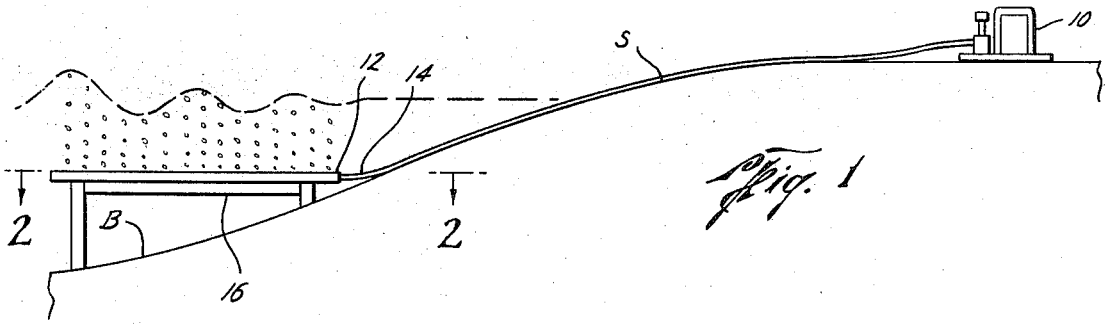
Fig. 1
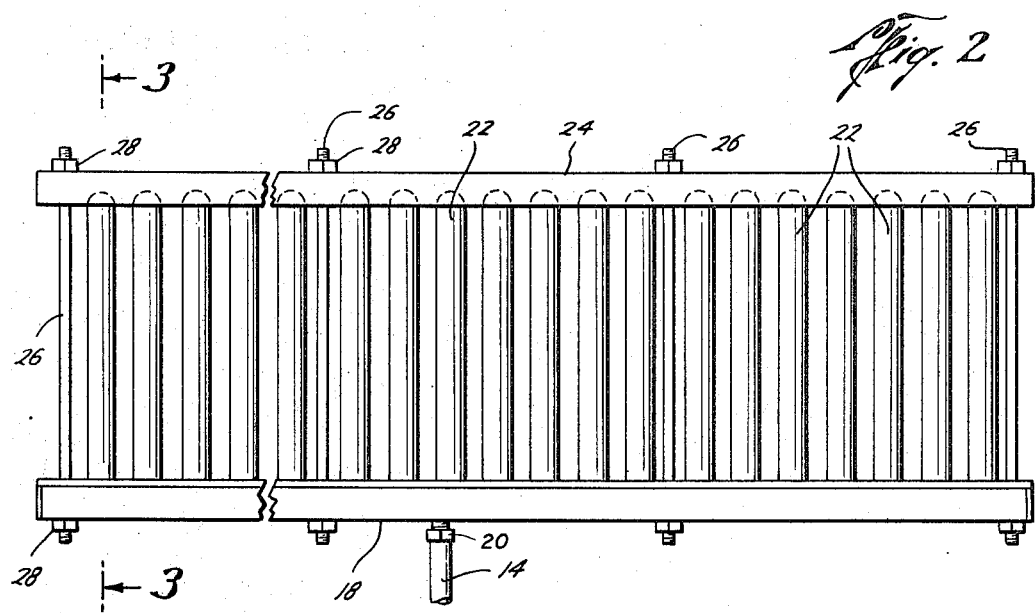
Fig. 2
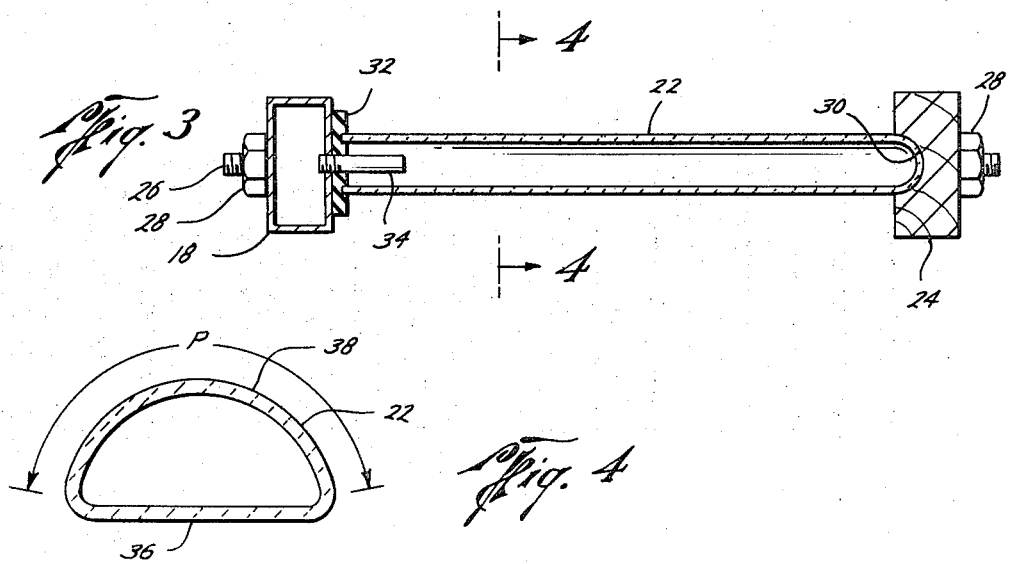
Fig. 3
Fig. 4

METHOD AND APPARATUS FOR DAMPING WAVE ACTION

SUMMARY

Many operations on water are much safer, cheaper and may be completed much quicker if the wave action is minimized. Many times physical barriers or breakwater structures are provided to control the wave action on the water in an area to be protected. Such physical barriers are not feasible in some locations such as for deep water drilling or for pipe laying barges.

Attempts have previously been made to damp wave action by the injection of sufficient amounts of air under the water to create surface flow patterns of the water. Such pneumatic systems were not successful to create the desired wave damping economically.

It is therefore an object of the present invention to provide an improved method and apparatus for damping wave action by injection of air below the surface of the water.

This invention provides the improved wave damping by the injection of minute, discrete air bubbles in sufficient amount and at a depth near the lowest portion of the orbital motion of the water due to wave action.

BRIEF DESCRIPTION OF THE DRAWINGS

FIG. 1 is a schematic elevation view of a wave damping system installed to protect a shore area from wave action.

FIG. 2 is a plan view of a preferred form of bubble generator assembly taken along line 2—2 in FIG. 1.

FIG. 3 is a sectional view of the assembly taken along line 3—3 in FIG. 2.

FIG. 4 is a detailed sectional view of the bubble generating element taken along line 4—4 in FIG. 3.

DESCRIPTION OF THE PREFERRED EMBODIMENT

The present invention provides the improved method and apparatus for supplying air to water to damp the action of waves on the water. Such damping is achieved when the air is injected into the water as a plurality of discrete, minute bubbles. It is difficult to preselect the size of bubbles, particularly since many bubbles which initially form at the surface of some materials continue to grow in size before releasing to rise upwardly through the water.

In addition to the surface characteristic of the material being used as the bubble generating element, the pore size through which the air escapes functions to control the size of the bubbles produced. The introduction of the air bubbles deeper in the water than needed results in the bubbles being larger than desired in the portions of the water affected by the wave action.

By providing the desired number of air bubbles of the desired size at the desired depth, such bubbles are believed to be suitable to damp wave action. It is believed that bubbles which are sufficiently small and thus present large surface interface with the water cause this damping by being thermo-dynamically compressed and expanded (which action is not thermo-dynamically reversible) and thereby convert the kinetic energy of the water to thermal energy to dissipate the energy of the waves.

In the preferred form of apparatus shown, a means for supplying air under pressure, such as compressor 10, is connected to the bubble generating assembly 12 by a duct or hose 14 to deliver the air to the assembly for injection into the water.

As shown in FIG. 1 the apparatus is being used to protect the shore S from the action of the waves. Thus the bubble generating assembly 12 is supported at a preselected depth in the water by the support means 16. The support means illustrated is a mechanical support resting on the bottom B. In deep water applications the bubble generating assembly 12 may be supported at its preselected depth below the water surface by suitable flotation means.

The bubble generating assembly 12 includes the air manifold 18 having the fitting 20 for connecting hose 14 thereto, the bubble generating elements 22 and means for supporting the elements 22 in communication with manifold 18 and extending in a generally horizontal position. Such element support means includes the bar 24 and the tie rods 26 and nuts 28 which hold the bar 24 and manifold 18 together with the elements 22 therebetween. As can be seen best in FIG. 3, the outer ends of elements 22 are rounded or suitably formed to be received in the recesses 30 formed in bar 24. The inner ends of elements 22 are open and are sealed against the gasket 32 and communication into the elements 22 from manifold 18 is provided by the tubes 34 which extend through the gasket 32 and the wall of manifold 18.

The element 22 has a preferred tubular shape with a generally flat lower portion 36 and an arcuate upper portion 38. The porous portion P is over most of the arcuate portion 38 of the element 22.

A suitable element is a product having the configuration shown and described of ceramic material having pore diameters in the range from 1.5 to 2.2 microns. With pressure of 20 psi the rate of flow of water is from 0.4 to 0.7 milliliters per second per square inch. Air pressure in the range from 19 to 28 psi provides the desired discrete, minute bubbles. The element described is made by Coors Porcelain Company and has an apparent porosity mean average of 42.1 percent, an absorption mean average of 22.8 percent and a specific gravity of 1.83.

Other materials or devices may be suitable as the bubble generating elements of the present invention provided that they generate the discrete, minute bubbles. Such other materials should have the desired small pore size and the surface characteristics to produce such discrete minute bubbles which by the irreversible thermodynamic compression and expansion produce the wave damping effect desired.

The operation of the system proceeds with the proper positioning of the bubble generating assembly 12 so that it is spaced from the area to be protected in the direction toward the waves. Also the assembly 12 is preferred to be positioned at a depth approaching the depth at which significant orbital motion of the water responsive to the waves ceases.

With the assembly 12 in place the air is supplied thereto by starting the compressor 10. The air flows from compressor 10 through the hose 14, the manifold 18, the tubes 34 and into the bubble generating elements 22. As previously explained the elements 22 are selected for their porosity and surface so that they will release the bubbles into the water as a multitude of individually discrete, minute bubbles.

As explained, it is believed that such bubbles are compressed and expanded by the wave action to convert the kinetic wave energy into thermal energy whereby the wave action is damped.

What is claimed is:

1. An apparatus for damping waves, comprising
means for supplying air,
bubble generating means which include,
an elongate manifold, a support bar, a plurality of bubble generating elements, means for retaining said bubble generating elements between said manifold and support bar, means providing communication into said elements from said manifold, means connecting the air supply means to the bubble generating manifold,
means for supporting the bubble generating means below the surface of the water,
said bubble generating elements having sufficiently small pores to generate a plurality of minute, discrete bubbles when supplied with air from said air supply means,
said bubble generating elements each including
a hollow ceramic tube,
a portion of the tube being porous,
the pores of said tube having a diameter of approximately two microns,
said tube having a flat lower portion and an arcuate upper portion in section with a substantial portion of the upper portion being porous.

* * * * *